(12) United States Patent
Deshpande et al.

(10) Patent No.: US 9,537,743 B2
(45) Date of Patent: Jan. 3, 2017

(54) MAXIMIZING STORAGE CONTROLLER BANDWIDTH UTILIZATION IN HETEROGENEOUS STORAGE AREA NETWORKS

(71) Applicant: International Business Machines Corporation, Armonk, NY (US)

(72) Inventors: Pankaj Deshpande, Pune (IN); Sapan Maniyar, Pune (IN); Sarvesh S. Patel, Dist. Nasik (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 14/261,469

(22) Filed: Apr. 25, 2014

(65) Prior Publication Data

US 2015/0312126 A1    Oct. 29, 2015

(51) Int. Cl.
*H04L 12/26* (2006.01)
*H04L 29/08* (2006.01)
*H04L 12/24* (2006.01)

(52) U.S. Cl.
CPC ........... *H04L 43/0894* (2013.01); *H04L 41/20* (2013.01); *H04L 67/1097* (2013.01)

(58) Field of Classification Search
CPC .................................................. H04L 43/0894
USPC ........................................................ 709/216
See application file for complete search history.

(56) References Cited

U.S. PATENT DOCUMENTS

| | | | | |
|---|---|---|---|---|
| 685,609 A | * | 10/1901 | Huff ...................... | B23D 63/14 76/41 |
| 5,822,300 A | * | 10/1998 | Johnson ................... | H04L 47/10 370/229 |
| 6,046,983 A | * | 4/2000 | Hasegawa ........... | H04L 12/5601 370/236.1 |
| 6,119,235 A | * | 9/2000 | Vaid ...................... | H04L 1/1854 709/235 |
| 6,526,060 B1 | * | 2/2003 | Hughes ............... | H04L 12/5693 370/395.4 |
| 7,016,971 B1 | * | 3/2006 | Recio ...................... | H04L 47/10 709/233 |
| 7,233,983 B2 | * | 6/2007 | Ward ...................... | H04L 49/10 709/220 |

(Continued)

OTHER PUBLICATIONS

Cisco, "Cisco DCNM SMI-S Server Support", URL provided by Inventor in post disclosure comment dated Jun. 10, 2013, <http://www.cisco.com/en/US/docs/switches/datacenter/mds9000/sw/5_2/programming/guides/smi-s/profiles.html#wp1067167>.

(Continued)

*Primary Examiner* — O. C. Vostal
(74) *Attorney, Agent, or Firm* — David B. Woycechowsky

(57) ABSTRACT

A storage area network controlled, part, by performing the following steps: (i) for each host link of a plurality of host links in a storage area network (SAN), determining a maximum possible data transfer rate; (ii) for each host link of a plurality of host links in a storage area network, determining a maximum permitted data transfer rate based on the maximum possible data transfer rate; (iii) making a plurality of data transfers, through SAN fabric of the SAN and between a storage controller module of the SAN and various host links of the plurality of host links; and (iv) for each data transfer, controlling the data transfer so that a data transfer rate for the data transfer does not exceed the maximum permitted data transfer rate.

18 Claims, 6 Drawing Sheets

(56) References Cited

U.S. PATENT DOCUMENTS

| | | | | |
|---|---|---|---|---|
| 7,308,494 | B1* | 12/2007 | Drew | G06F 17/509 370/217 |
| 7,337,206 | B1* | 2/2008 | Wen | H04L 12/2602 370/235 |
| 7,401,124 | B2* | 7/2008 | Bello | G06F 3/0613 709/213 |
| 7,730,201 | B1* | 6/2010 | McAllister | H04L 12/5602 709/233 |
| 7,773,521 | B2 | 8/2010 | Zhang et al. | |
| 7,782,777 | B2* | 8/2010 | Kilkki | H04L 47/10 370/235 |
| 8,351,331 | B2* | 1/2013 | Karagiannis | H04L 43/045 370/232 |
| 8,467,342 | B2 | 6/2013 | Loh et al. | |
| 8,516,121 | B1* | 8/2013 | Telang | H04L 67/1097 707/640 |
| 8,787,388 | B1* | 7/2014 | Adams | H04L 45/38 370/244 |
| 9,154,589 | B1* | 10/2015 | Klein | H04L 69/329 |
| 2004/0218531 | A1* | 11/2004 | Cherian | H04L 47/10 370/235 |
| 2005/0108444 | A1* | 5/2005 | Flauaus | H04L 12/2602 710/15 |
| 2005/0120141 | A1* | 6/2005 | Zur | H04L 29/06 709/249 |
| 2006/0239188 | A1* | 10/2006 | Weiss | H04L 47/10 370/229 |
| 2007/0076598 | A1* | 4/2007 | Atkinson | H04L 47/10 370/229 |
| 2007/0115846 | A1* | 5/2007 | Kooyers | H04L 43/0847 370/252 |
| 2007/0153683 | A1* | 7/2007 | McAlpine | H04L 12/2602 370/229 |
| 2007/0268829 | A1* | 11/2007 | Corwin | H04L 47/10 370/235 |
| 2008/0298248 | A1* | 12/2008 | Roeck | H04L 47/10 370/237 |
| 2010/0202294 | A1 | 8/2010 | Mullendore et al. | |
| 2010/0306408 | A1* | 12/2010 | Greenberg | H04L 12/4633 709/238 |
| 2011/0231541 | A1* | 9/2011 | Murthy | G06F 3/0613 709/224 |
| 2011/0261696 | A1* | 10/2011 | Crisan | H04L 45/00 370/235 |
| 2012/0020219 | A1* | 1/2012 | Kamiya | H04L 45/125 370/235 |
| 2012/0163178 | A1* | 6/2012 | Gordon | H04L 47/24 370/237 |
| 2012/0257671 | A1* | 10/2012 | Brockmann | H04N 21/64753 375/240.02 |
| 2012/0324146 | A1 | 12/2012 | Marks et al. | |
| 2013/0219079 | A1 | 8/2013 | Padia et al. | |
| 2013/0322242 | A1* | 12/2013 | Swenson | H04L 47/11 370/232 |
| 2014/0301209 | A1* | 10/2014 | Gineste | H04W 28/0215 370/236 |
| 2015/0039744 | A1* | 2/2015 | Niazi | H04L 43/0876 709/224 |
| 2015/0124611 | A1* | 5/2015 | Attar | H04L 47/283 370/235 |
| 2015/0149631 | A1* | 5/2015 | Lissack | H04L 41/5051 709/226 |
| 2015/0172193 | A1* | 6/2015 | Sinha | H04L 47/12 370/230 |

OTHER PUBLICATIONS

IEEE, "IEEE 802.1: 802.1Qbb—Priority-based Flow Control", Last modified on Sep. 15, 2011 at 11:40PM, <http://www.ieee802.org/1/pages/802.1bb.html>.

Lu et al., "Congestion control in networks with no congestion drops", Provided by Searcher in report dated Oct. 9, 2013, <http://www.google.co.in/url?sa=t&rct=j&q=&esrc=s&source=web&cd=2&ved=0CC8QFjAB&url=http%3A%2F%2Fwww.ieee802.org%2F1%Ffiles%2Fpublic%2Fdocs2006%2Fau-Lu-et-al-BCN-study.pdf&ei=eclTUti1FpDorQfL0IDQAQ&usg=AFQjCNGxHYGiwgZqfT6hGIRtTKDN6tsBUw&bvm=bv.53760139,d.bmk>.

"Storage Management Initiative—Specification", Wikipedia, the free encyclopedia, page last modified on Oct. 1, 2013 at 14:04.

Deshpande et al., "Maximizing Storage Controller Bandwidth Utilization in Heterogeneous Storage Area Networks", U.S. Appl. No. 15/070,019, filed Mar. 15, 2016, 23 pages.

Appendix P—List of IBM Patents or Patent Applications Treated as Related. 2 pages.

* cited by examiner

MAXIMIZING STORAGE CONTROLLER BANDWIDTH UTILIZATION IN HETEROGENEOUS STORAGE AREA NETWORKS

BACKGROUND OF THE INVENTION

The present invention relates generally to the field of storage area networks (SANs), and more particularly to control of storage controller bandwidth. A storage area network is a dedicated network that provides data storage, which is typically in the form of consolidated, block level data storage. SANs are often used to enhance storage devices, such as disk arrays, tape libraries, and optical jukeboxes. Typically, SANs are accessible to servers so that the devices appear like locally attached devices to the operating system. A SAN typically has its own network of storage devices that are generally not accessible through the local area network by other devices. Typically, a SAN does not provide file abstraction, but, rather, only block-level operations. However, file systems built on top of SANs do provide file-level access, and are known as SAN filesystems or shared disk file systems.

Emergence of Converged Enhanced Ethernet (CEE) with 10/40/100 Gbps (gigabits per second) Ethernet along with 10/40/100 Gbps FCoE (Fibre Channel over Ethernet), 16 Gbps Fibre channel have led to creation of truly heterogeneous SAN fabrics. These heterogeneous SAN fabrics typically include a mixture of Fiber Channel and Ethernet networks. Even on the same Ethernet backbone, storage protocols like Fibre Channel Over Ethernet (FCoE) and iSCSI are used to transport SAN traffic over the same Ethernet infrastructure. The CEE network can be connected to a native Fibre channel network using Fibre Channel Forwarders (FCFs) to create a heterogeneous fabric consisting of both Ethernet and Fiber Channel fabrics. Some currently conventional SAN fabrics include a combination of 4 Gbps/8 Gbps/16 Gbps fiber channel elements and 10 Gbps/40 Gbps/100 Gbps ethernet elements.

Currently conventional storage controllers do not "understand" the SAN fabric topology. The storage controller simply transmits as much data as it is being requested by the host. Under heavy load the amount of data it can transmit either gets limited by its own link bandwidth or the link bandwidth of the host. When the link bandwidth of the host is less than that of the storage controller, the storage controller's data transmission is limited by the switch that employs congestion control techniques. The storage controller should avoid saturating host port links.

Currently conventional storage controllers do not "understand" the SAN fabric topology. The storage controller simply transmits as much data as it is being requested by the host. Under heavy load the amount of data it can transmit either gets limited by its own link bandwidth or the link bandwidth of the host. When the link bandwidth of the host is less than that of the storage controller, the storage controller's data transmission is limited by the switch that employs congestion control techniques.

SUMMARY

According to an aspect of the present invention, there is a method, system and/or computer program product that performs the following steps (not necessarily in the following order): (i) for each host link of a plurality of host links in a storage area network (SAN), determining a maximum possible data transfer rate; (ii) for each host link of a plurality of host links in a storage area network, determining a maximum permitted data transfer rate based on the maximum possible data transfer rate; (iii) making a plurality of data transfers, through SAN fabric of the SAN and between a storage controller module of the SAN and various host links of the plurality of host links; and (iv) for each data transfer, controlling the data transfer so that a data transfer rate for the data transfer does not exceed the maximum permitted data transfer rate.

DETAILED DESCRIPTION

Figure 1:
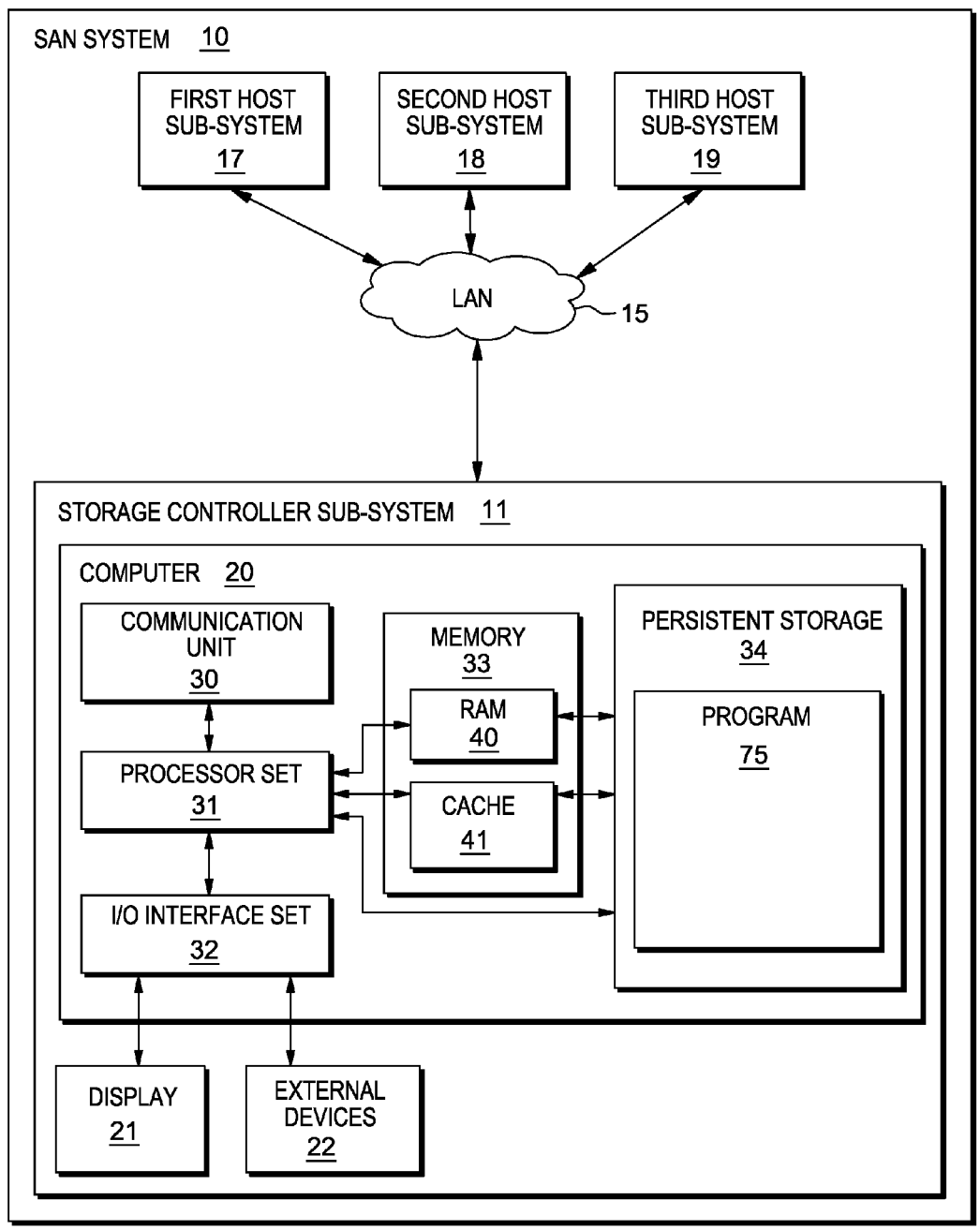
FIG. 1 is a schematic view of a first embodiment of a system according to the present invention.

Instead of using SAN flow control to prevent congestion, a maximum permissible data transfer rate is set for each host link between a host and the SAN fabric. This maximum permissible data transfer rate may be configured once and applicable to all data transfers through the corresponding host link, or the maximum permissible data transfer rate may be determined each time a data transfer is made. In some embodiments, the maximum permissible data transfer rate may simply be equal to the maximum possible data transfer rate for that host link. However, in other embodiments the maximum permissible data transfer rate may be set lower than the maximum possible data transfer rate. For example, if more than one independently operated storage controller may be communicating, simultaneously, through the same host link, then the maximum permissible data transfer rates may be set such that their sum is equal to the maximum possible data transfer rate. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of SAN system 10, including: storage controller sub-system 11; local area network (LAN, also called SAN fabric) 15; host sub-systems 17, 18, 19 (including respective host links shown as double arrows connecting the host link blocks to LAN 15) computer 20; communication unit 30; processor(s) set 31; input/output (I/O) interface set 32; memory device 33; persistent storage device 34; display device 21; external device set 22; random access memory (RAM) devices 40; cache memory device 41; and program 75.

Sub-system 11 may include a laptop computer, tablet computer, netbook computer, personal computer (PC), a desktop computer, a personal digital assistant (PDA), a smart phone, or any programmable electronic device capable of communicating with the client sub-systems via LAN 15. Program 75 is a collection of machine readable instructions and/or data that is used to create, manage and control certain software functions that will be discussed in detail, below, in the Example Embodiment sub-section of this Detailed Description section.

Sub-system 11 is capable of communicating with hosts 17, 18, 19 via LAN 15 and their respective host links. Because SAN system 10 is heterogeneous, these means that the hardware and software used to implement the various host links include at least two different types. LAN 15 can be, for example, any type of network suitable for supporting a SAN (now or in the future), and can include wired, wireless, or fiber optic connections. In general, LAN 15 can be any combination of connections and protocols that will support communications between server and client sub-systems.

Sub-system 11 is shown as a block diagram with many double arrows. These double arrows (no separate reference numerals) represent a communications fabric, which provides communications between various components of sub-system 11. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 33 and persistent storage 34 are computer-readable storage media. In general, memory 33 can include any suitable volatile or non-volatile computer-readable storage media. It is further noted that, now and/or in the near future: (i) external device(s) 22 may be able to supply, some or all, memory for sub-system 11; and/or (ii) devices external to sub-system 11 may be able to provide memory for sub-system 11.

Program 75 is stored in persistent storage 34 for access and/or execution by one or more of the respective computer processors 31, usually through one or more memories of memory 33. Persistent storage 34: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 34.

Program 75 may include both machine readable and performable instructions and/or substantive data (that is, the type of data stored in a database). In this particular embodiment, persistent storage 34 includes a magnetic hard disk drive. To name some possible variations, persistent storage 34 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 34 may also be removable. For example, a removable hard drive may be used for persistent storage 34. Other examples include optical and magnetic disks, thumb drives, and smart cards that are inserted into a drive for transfer onto another computer-readable storage medium that is also part of persistent storage 34.

Communications unit 30, in these examples, provides for communications with other data processing systems or devices external to sub-system 11. In these examples, communications unit 30 includes one or more network interface cards. Communications unit 30 may provide communications through the use of either or both physical and wireless communications links. Any software modules discussed herein may be downloaded to a persistent storage device (such as persistent storage device 34) through a communications unit (such as communications unit 30).

I/O interface set 32 allows for input and output of data with other devices that may be connected locally in data communication with computer 20. For example, I/O interface set 32 provides a connection to external device set 22. External device set 22 will typically include devices such as a keyboard, keypad, a touch screen, and/or some other suitable input device. External device set 22 can also include portable computer-readable storage media such as, for example, thumb drives, portable optical or magnetic disks, and memory cards. Software and data used to practice embodiments of the present invention, for example, program 75, can be stored on such portable computer-readable storage media. In these embodiments the relevant software may (or may not) be loaded, in whole or in part, onto persistent storage device 34 via I/O interface set 32. I/O interface set 32 also connects in data communication with display device 21.

Display device 21 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. EXAMPLE EMBODIMENT

Figure 2:
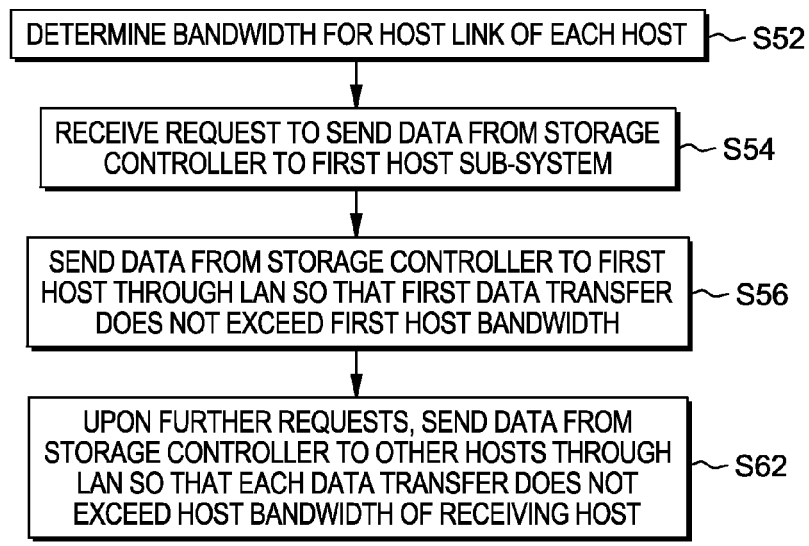
FIG. 2 is a flowchart showing a method performed, at least in part, by the first embodiment system.
Figure 3:
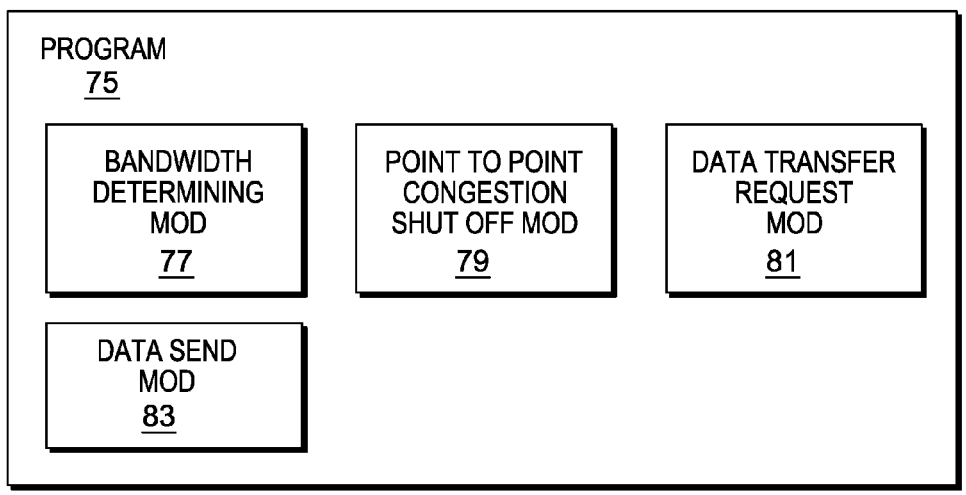
FIG. 3 is a schematic view of a machine logic (for example, software) portion of the first embodiment system.

FIG. 2 shows flowchart 50 depicting a method according to the present invention. FIG. 3 shows program 75 for performing at least some of the method steps of flowchart 50. This method and associated software will now be discussed, over the course of the following paragraphs, with extensive reference to FIG. 2 (for the method step blocks) and FIG. 3 (for the software blocks).

Processing begins at step S52, where bandwidth determining module ("mod") 77 determines permissible data transfer rates (or "bandwidths") that can be communicated through each host link (that is, the double arrows extending from blocks 17, 18 and 19 of FIG. 1). More specifically, in this embodiment, the transfer rates will apply to data communicated through SAN fabric 15 to the host, and also to data communicated from the host to the SAN fabric 15. This determination of host link bandwidths may be done manually by receiving user input from a human, or automatically under the control of machine logic (for example, software).

In this embodiment, a maximum possible data transfer rate is used as a maximum permitted transfer rate. The maximum possible data transfer rate is the greatest data transfer rate permitted by the hardware and/or software used to create the host links. Because SAN system 10 is a heterogeneous SAN, the host links are of at least two different types that collectively have at least two maximum data transfer rates. While this embodiment uses maximum data transfer rate values for corresponding maximum permitted data transfer value rates, other embodiments may set the maximum permitted data transfer rates to be based on the maximum possible data transfer rate, but lower than the maximum possible data transfer rate. The Further Comments And/or Embodiments sub-section of this Detailed Description section will discuss an example of this where there is a possibility that two independent storage controllers will be simultaneously communicating through the same host link.

In this embodiment, mod 77 determines all of the maximum data transfer rates during storage controller configuration. In this embodiment there is no reason to change a maximum data transfer rate once it is configured in the storage controller, however, it may be possible at least in theory where a change to the maximum permitted data transfer rate for a host link is made intermittently (automatically or manually) depending on operating conditions of the SAN.

In this embodiment, each host 17, 18, 19 has only a single host link. In other embodiments, a single host may have more than a single port and more than a single link. In this embodiment, there is only a single storage controller sub-sub-system 11. Alternatively, and as will be discussed in detail in the further Comments And/Or Embodiments sub-section, some embodiments may have more than one storage controller, and multiple storage controllers may, or may not, be independently controlled.

In this embodiment at step S52, point to point congestion shut off mod 79 disables any existing and enabled flow control on the SAN fabric (that is, LAN 15). This is because reliable flow of data will now be controlled by controlling the data communications such that host link maximum data transfer rates are set and observed, thus eliminating the need for flow control on the SAN fabric. Alternatively, flow control on the SAN fabric may be kept in place, or throttled back without being completely disabled.

Processing proceeds to step S54, where data transfer request mod 81 receives a request to transfer certain data, from storage controller sub-system 11, through SAN fabric 15 and to first host sub-system 17. This step is similar to data transfer requests as currently practiced in conventional SANs.

Processing proceeds to step S56, where data send mod 83 sends the requested data, from storage controller sub-system 11, through SAN fabric 15 and to first host sub-system 17, at a data transfer rate (or "bandwidth") that does not exceed the maximum permitted data transfer rate determined earlier at step S52 for host sub-system 17. Processing proceeds to step S62 where similar data transfer requests, respectively involving the various host sub-systems 17, 18, 19, are handled similarly, with similar regard to applicable maximum permitted data transfer rate limits per host.

III. FURTHER COMMENTS AND/OR EMBODIMENTS

Some embodiments of the present invention recognize the following facts, potential problems and/or potential areas for improvement with respect to the current state of the art: (i) in a heterogeneous SAN fabric (that is, a fabric including links having multiple different bandwidths), congestion control between the storage controller and host becomes a challenge; (ii) existing congestion control mechanisms that use point to point congestion control are not adequate to optimally utilize the storage controller's link bandwidth; (iii) if flow control is not enforced in a mismatched fabric, a host connected to a fabric via a low bandwidth link (say 1 Gbps) to a mismatched high bandwidth Storage Controller (say 10 Gbps) can ask for more data than its link can carry; (iv) flow control problems can result in dropped frames and/or decrease bandwidth utilization for host(s); (v) under existing flow control techniques a host will push back on the storage controller using flow control techniques like PAUSE frames; (vi) the storage controller experiences push back, it pauses all traffic emanating from the storage controller; (vii) pausing of the traffic that all other hosts connected to the same fabric and sharing the same controller will see the effect of the PAUSE; (viii) a single "misbehaving" host can end up choking up the high bandwidth link of the Storage Controller for all hosts; and/or (ix) existing techniques of flow control are inadequate to serve mismatched data pipe sizes within a converged network.

Some embodiments of the present invention further recognize that conventional SANS are unable to divide available bandwidth from a shared storage controller amongst multiple hosts. More specifically, the Enhanced Transmission Selection (ETS) standard allows the administrator to limit bandwidth usage to different types of traffic within the network like FCoE (Fibre Channel over Ethernet), TCP/IP (Transmission Control Protocol/Internet Protocol), iSCSI (Internet Small Computer System Interface), etc., but this does not result in availability of different storage controller bandwidth values across multiple hosts.

Some embodiments of the present invention recognize the following facts, potential problems and/or potential areas for improvement with respect to the current state of the art: (i) the bandwidth utilization of the storage controller can be limited by the host connected with the lowest bandwidth link; (ii) one slow host can result in performance degradation for all other hosts that use the same storage controller; (iii) existing flow control techniques employ point to point flow control mechanism to avoid congestion within a fabric, but this is inadequate in a converged fabrics; and/or (iv) converged SANs can consist of fabrics that use lossy, lossless and native fiber channel fabrics & Ethernet fabrics bridged to each other. Each has a different flow control technique and it is very difficult to map them across each other. Further with respect to item (iv), flow control compatibility issues can become a major problem resulting in very large compatibility testing matrices that consume significant time and resources and are yet unable to work for all combinations.

Some embodiments of the present invention further recognize the following facts, potential problems and/or potential areas for improvement with respect to the current state of the art: (i) in a heterogeneous SAN environment, congestion problems can be caused due to a storage controller sending more data to a host port, than the host port link bandwidth allows; and/or (ii) the issue of too much data being sent to a host port happens when the storage controller is connected to the SAN via a higher bandwidth link, compared to the hosts.

Some embodiments of the present invention may include one, or more, of the following features, characteristics and/or advantages: (i) the storage Controller employs a proactive strategy to avoid triggering congestion on the link between the storage controller and the switch; (ii) the storage controller refrains from sending more data to the host than the host link bandwidth is capable of; (iii) because there is no congestion at the host or the storage controller end, the point to point congestion control mechanism between the switch and the storage controller will not be activated; and/or (iv) better utilization of storage controller link bandwidth.

In some embodiments of the present invention, the storage controller needs to know the total link bandwidth for each host OR the link bandwidth of each host port. This can be achieved in various ways. The host bandwidth can be manually specified by the user when the host entity is registered with the storage controller. Alternatively the storage controller can discover the fabric topology and automatically find out the Host end point interconnect type and determine its bandwidth based on the host identifier like WWPN (World Wide Port Name) or IQN (IQN=iSCSI Qualified Name). The storage controller can query external SAN management software to discover the host interconnect bandwidths. This capability can be extended to limit the maximum amount of bandwidth that can be used by a host even though its physical network capability is higher. That way, per host bandwidth limitation can be enforced, which would otherwise be impossible to achieve via network capabilities like ETS (as mentioned earlier).

Some embodiments of the present invention may include one, or more, of the following features, characteristics and/or advantages: (i) allows for full utilization of storage controller bandwidth; (ii) one host with a slow interconnect cannot affect the performance seen by other hosts; (iii) because network congestion control is not kicked in, the hosts see relatively better performance in terms of QoS (Quality of Service) and bandwidth; (iv) reduction of the type of operation characterized by continuous cycles of full bandwidth and low bandwidth phases; (v) better utilization of high bandwidth links allows a reduction in the number of ports on the storage controller and the switch; (vi) the storage controller can use a few high bandwidth ports instead of several low bandwidth ports; (vii) power, cost and/or cabling efficiency; (viii) allows the administrator to limit the maximum bandwidth that a host is allowed to use from a specific Storage Controller on the SAN, thus enforcing strict bandwidth SLAs for each host; and/or (ix) host-specific bandwidth limits can be helpful with respect to SLA (Service Level Agreement) enforcement in a multi-tenant environment.

Some embodiments of the present invention recognize that the storage controller should avoid saturating host port links. To avoid this, the storage controller needs to know the end point link bandwidth of the hosts. The link bandwidth can be specified manually by the administrator when the host object is configured with the storage controller, or the storage controller can query a SAN management service on the SAN to determine the bandwidth of the host link. A clustered storage system can consist of multiple controllers to provide redundancy. In well-configured, redundant SANs, each host port will be connected to two storage controllers for redundancy. In some embodiments, the controllers co-ordinate with each other, so that the total data sent to a host port is limited to the host port bandwidth. Co-ordination between two controllers for the same host port can be done in several different ways without adding too much co-ordination overhead.

For example, when two controller ports are connected to the same host port, each controller port could initially start with a quota of 50% bandwidth of the host bandwidth. After an observation period, one of two approaches will be taken depending on the host multipath configuration. These two approaches will be respectively discussed in the following two paragraphs.

First Approach: The host uses a preferred path (storage controller) to initiate IOs (input/output operations) to a virtual data storage space (for example, a Virtual Disk). In such scenarios, the entire bandwidth quota for the host port will be transferred to the preferred controller, thus ensuring full bandwidth utilization. It is relatively simple and quick for the storage controller to detect the behavior of the host and transfer bandwidth to the preferred controller.

Second Approach: The host uses a round-robin policy to initiate IOs to the storage controller. In such scenarios, the host port bandwidth will continue to be distributed equally across both the storage controllers to ensure maximum bandwidth utilization for the host.

In a case where a host is connected to multiple storage systems, the host port bandwidth is divided among a set of storage systems, such that the total data sent from all the storage systems to the host does not combine saturate (or overload) the host port links.

Figure 4:
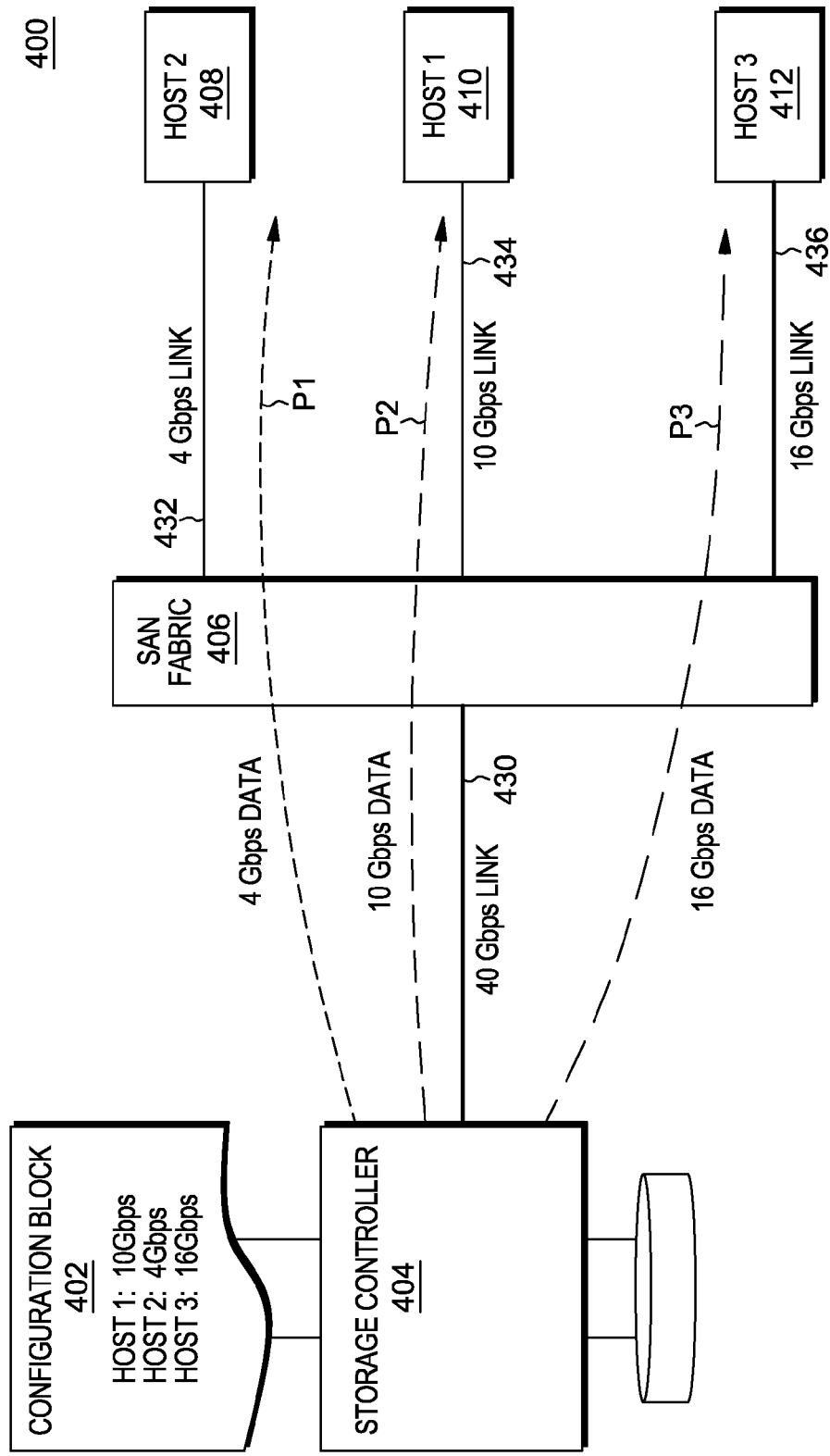
FIG. 4 is a schematic view of a second embodiment of a system according to the present invention.

As shown in FIG. 4, SAN system 400 is a storage controller link bandwidth management with static configuration type SAN. System 400 includes: configuration data 402; storage controller 404; SAN fabric 406; Host 2 (or, simply "host") 408; Host 1 (or, simply "host") 410; Host 3 (or, simply "host") 412; storage controller link 430; and host links 432, 434, 436.

In SAN system 400: (i) the storage controller does not automatically present volumes to a host; (ii) host object is configured on the storage controller, and then volumes are mapped to the host object; (iii) when the host object is configured, an identifier (like Fibre Channel WWPN or iSCSI IQN) is specified for each Host port; (iv) when the details of a host port are configured, the administrator provides the link bandwidth each in the SAN; (v) having the information of the link bandwidth for each host port enables the storage controller to limit the maximum permitted bandwidth of data sent to a given host port to be equal to or less than the link bandwidth for that host; (vi) the administrator can also specify a lower host link bandwidth than the actual capability of the link to accommodate other traffic on the host port; (vii) setting lower-than-actual-capability type maximum bandwidths for some, or all, host links can reduce, or eliminate, congestion on host links; and/or (viii) setting lower-than-actual-capability type maximum bandwidths for some, or all, host links can avoid any congestion control on the storage controller link.

In some embodiments of the present invention, the use of per-host maximum bandwidth control, implemented by the storage controller, allows elimination (or at least disabling) of network based flow control between the storage controller and the hosts. More specifically, in some embodiments, network flow control would not be disabled because there is no need to disable it because, in turn, the congestion limit that causes congestion control to take actions is not reached due to the storage controller sending limited data to the host depending on the host bandwidth. Also, in some fabrics it may not be possible to disable network flow control. This, in turn, can: (i) ensure that network based flow control compatibility across lossy, lossless and fiber channel fabrics is not required; (ii) eliminate the need to test and debug different types of equipment with each other for flow control and QOS (Quality Of Service) compatibility; (iii) improve on currently conventional flow control techniques; and/or (iv) be much better suited to converged fabrics.

Figure 5:
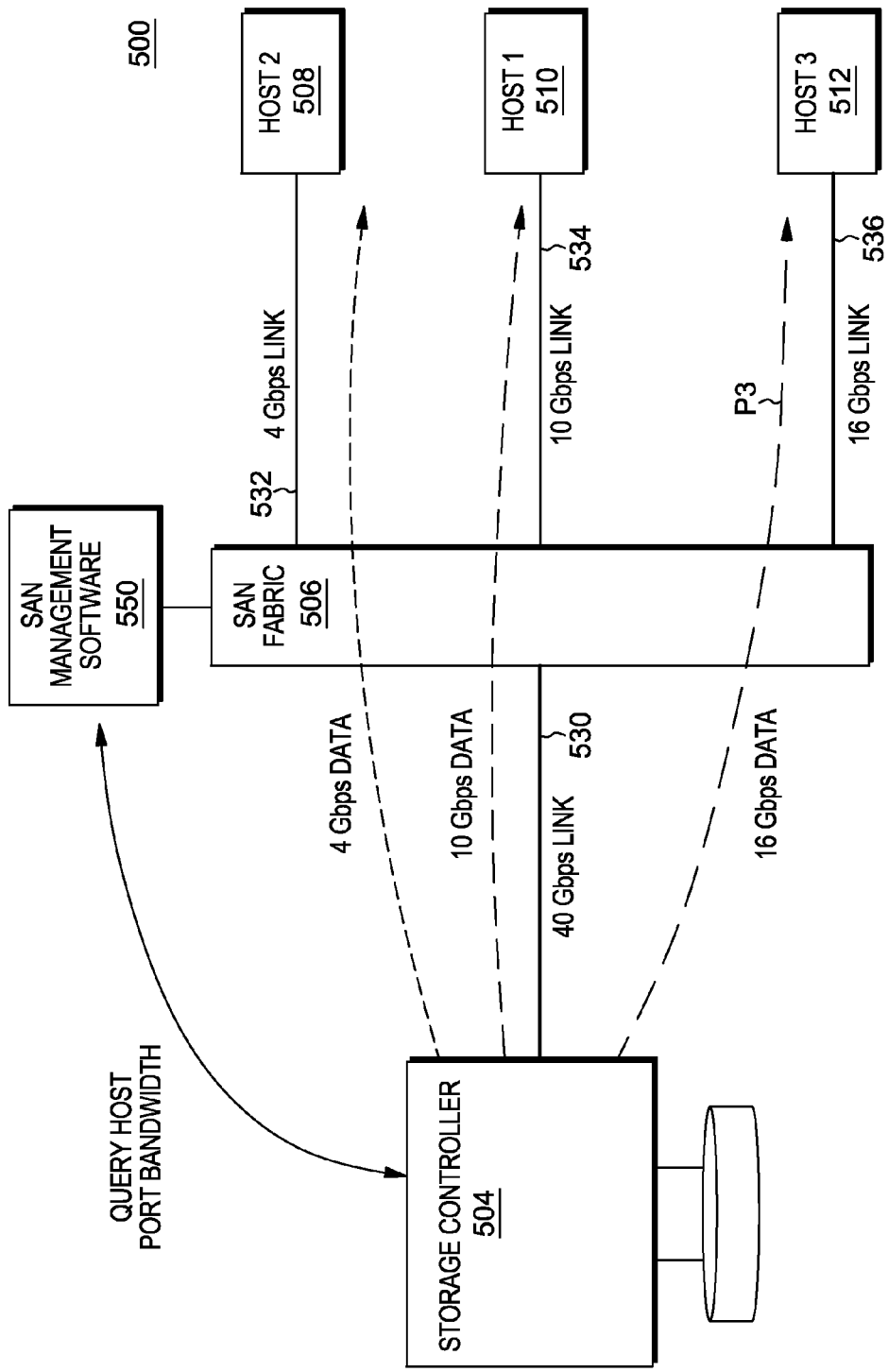
FIG. 5 is a schematic view of a third embodiment of a system according to the present invention.

As shown in FIG. 5, SAN system 500 is an automatic storage controller link bandwidth management type SAN. System 500 includes: storage controller 504; SAN fabric 506; Host 2 (or, simply "host") 508; Host 1 (or, simply "host") 510; Host 3 (or, simply "host") 512; storage controller link 530; host links 532, 534, 536; and SAN management software 550.

In SAN system 500: (i) SAN management software 550 "understands" the topology of SAN fabric 506; and (ii) SAN management software has information regarding host link bandwidth and other characteristics of all elements communicating through SAN fabric 506. In system 500, when a host object 508, 510, 512 is configured on storage controller 504, the storage controller queries SAN management software 550 to determine the bandwidth of each host port link 532, 534, 536. This information is saved by the storage controller with the host object configuration. This enables storage controller 504 to limit the data it sends to the port of each host 508, 510, 512, thereby preventing congestion on SAN fabric 506. San system 500 allows the administrator to limit the maximum amount of bandwidth that each host 508, 510, 512 is allowed to use. For example, even though hosts 508, 510, 512 are respectively capable of using 4, 10, and 16 Gbps (gigabits per second), the administrator can limit the maximum bandwidth usage of, say, host 512 to, say, 8 Gbps. This helps enforce strict bandwidth SLAs that cannot be exceeded and this is potentially beneficial in a cloud environment.

Figure 6:
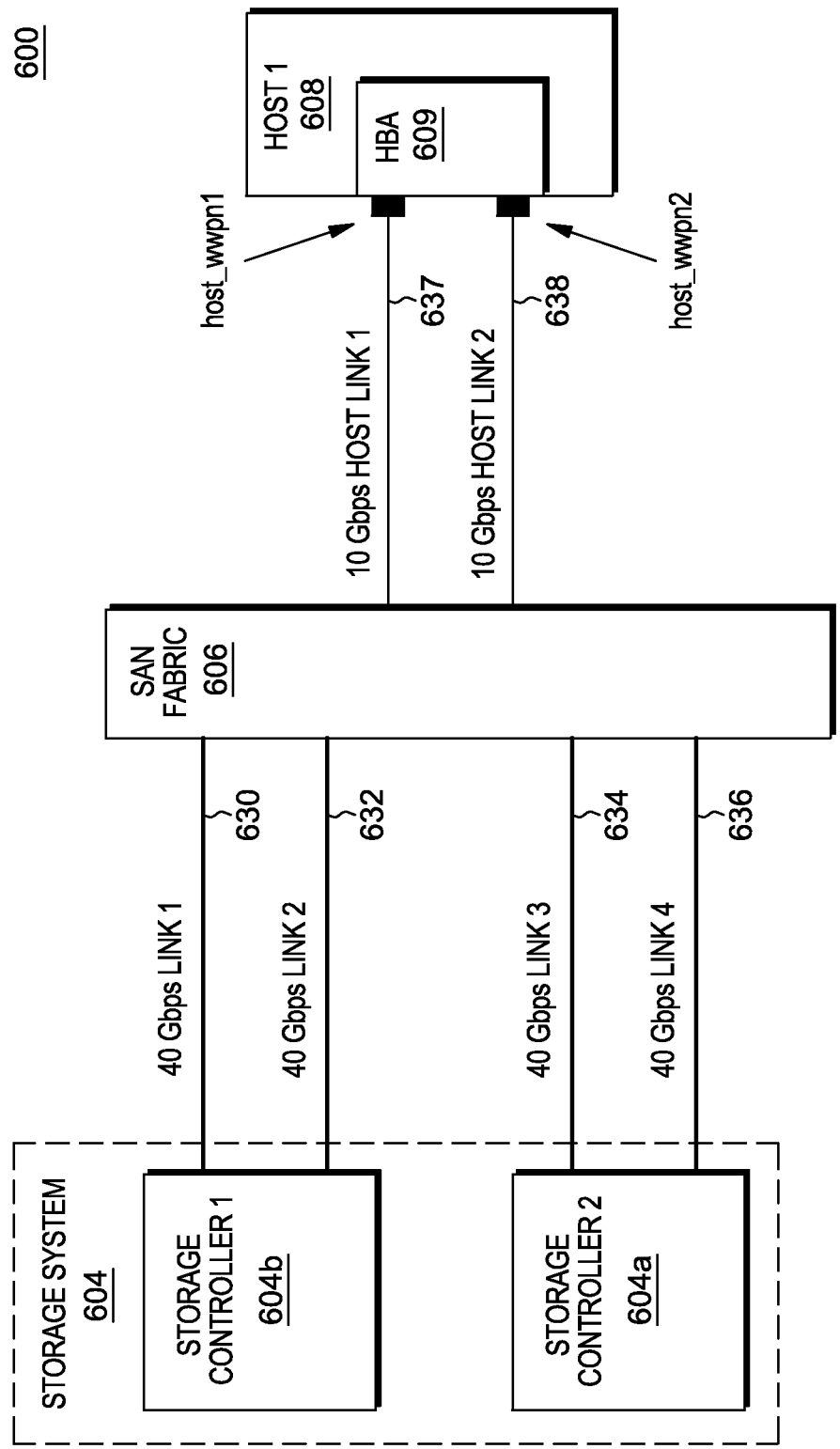
FIG. 6 is a schematic view of a fourth embodiment of a system according to the present invention.

As shown in FIG. 6, SAN system 600 is a host configuration on clustered storage type system. System 600 includes: storage system 604 (including coordinated storage controllers 604a, b); SAN fabric 606; Host 1 (or, simply "host") 608 (including host bus adapter (HBA) 609); and links 630, 632, 634, 636, 637 and 638.

In system 600, a host object is configured on a clustered storage system. System 600 is similar to system 400 in that the host configurations stored in the storage controller(s) is where the host-specific maximum bandwidth values are stored. This specifies the host port bandwidth statically while configuring the host object on the storage system. System 600 includes a storage system which consists of two (2) storage controllers 604a, 604b. Each controller is connected to SAN fabric 606 using two 40 Gbps links. Host 608 has one host bus adapter (HBA) 609 with two 10 Gbps ports (host_wwpn1 and host_wwpn2). Host HBA ports are connected to the SAN using 10 Gbps links 637, 638.

Examples of commands to configure the host 608 and HBA 609 will now be discussed. An example command to create the host object on storage system 604 is:
mkhost -name host1
An example command to configure the host ports of HBA 609 is:
addhostport -host host1 -wwpn host_wwpn1 --linkspeed 10 Gb
addhostport -host host1 -wwpn host_wwpn2 --linkspeed 10 Gb
An example command to map a volume to the host object is:
mapvolume -host host1 -volume vol_h1

As seen in the commands of the previous paragraph, in some embodiments, host port link speed is specified while configuring the host. The host can create logins from each of its ports to each of the storage controller ports. In the example of system 600, this results in a total of eight (8) logins/paths (that is, four storage controller ports on storage controller 604 times two host ports of HBA 609). In system 600, host 608 can send I/Os over all of the eight paths at the same time. Storage controller 604 can send up to 160 Gbps of data to the host, while the host can only receive data at a rate of 20 Gbps. Both storage controllers 604a,b coordinate with each other to ensure that the total data sent to a single host port does not exceed 10 Gbps. This will ensure that there is no congestion on any host port, thus avoiding flow control on SAN fabric 606. The coordination algorithm has been described earlier.

Figure 7:
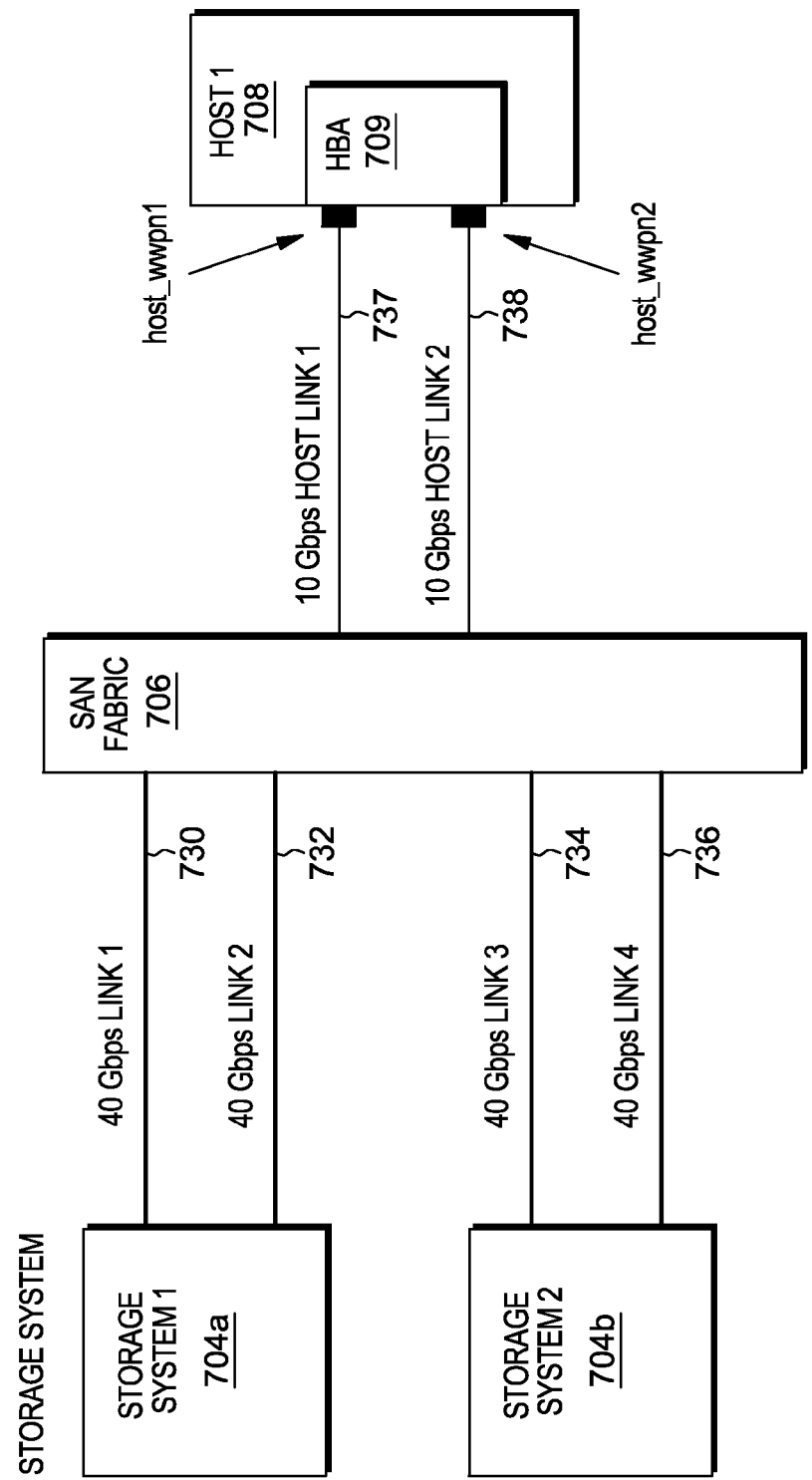
FIG. 7 is a schematic view of a fifth embodiment of a system according to the present invention.

As shown in FIG. 7, SAN system 700 is a host configuration with multiple storage type system. System 700 includes: independent storage systems 704a, b; SAN fabric 706; Host 1 (or, simply "host") 708 (including host bus adapter (HBA) 709); and links 730, 732, 734, 736, 737 and 738.

In system 700 host 708 is connected to multiple independent storage systems 704a, b. Because the storage systems are independent of each other, there is a chance that the total amount of traffic flowing from storage systems towards the host, will saturate host port links 737, 738. In this embodiment, the administrator divides the host port bandwidth between the storage systems so that the total data sent to the host ports of HBA 709 does not "saturate" host port links 737, 738.

In system 700: (i) Host 708 has one HBA 709 with two 10 Gbps ports (specifically, host_wwpn1 and host_wwpn2); (ii) host HBA ports 709 are connected to SAN fabric 706 using two respective 10 Gbps links 737, 738; (iii) two storage systems 704a, b are each connected SAN fabric 706 using two 40 Gbps links 730, 732, 734, 736; (iv) the link bandwidth specified for the host object ports on storage system 704a is 40 Gbps each; (v) the link bandwidth specified for the host object ports on storage system 704b is 40 Gbps each; and (vi) because of the foregoing maximum bandwidth limits, the total data sent from the storage systems to each host port of HBA 709 will not exceed 10 Gbps.

Examples of commands to configure the host object on storage systems 704a, b will now be discussed. An example command to create the host object on storage system 704a is:
mkhost -name host1
An example command to configure the host ports on storage system 704a is:
addhostport -host host1 -wwpn host_wwpn1 --linkspeed 2 Gb
addhostport -host host1 -wwpn host_wwpn2 --linkspeed 2 Gb
Example commands to create the host object and configure the host ports on storage system 704b are:
mkhost -name host1
addhostport -host host1 -wwpn host_wwpn1 --linkspeed 8 Gb
addhostport -host host1 -wwpn host_wwpn2 --linkspeed 8 Gb Some embodiments of the present invention may include one, or more, of the following features, characteristics and/or advantages: (i) configuring maximum bandwidth for host ports as part of a larger host object configuration process (for example, LUN (Logical Unit Number) mapping in order to make storage accessible to host ports, use of an mkhost CLI command to configure host objects) which the administrator may already be required to do in certain conventional systems; (ii) heterogeneous aspect of heterogeneous SAN handled by SMI-S(Storage management initiative-Specification), a storage standard that allows interoperable management of heterogeneous storage vendor systems; (iii) many vendors or fabric elements implement the required SMI-S profile, and can act as SMI-S Servers, which allows any application to query/configure the fabric element; (iv) the storage controller can act as a SMI-S client and query all the fabric information directly from the switch; (v) such queries would find out the port speed of the switch port to which a host is connected at which it is operating to provide the information required for setting maximum bandwidth limits; (vi) a SAN management software can act as a SMI-S Server and the storage controller can query fabric information from it; and/or (vii) a proactive approach to avoid congestion.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A method comprising:
   for each host link of a plurality of host links in a storage area network (SAN), determining a maximum possible data transfer rate;
   for each host link of a plurality of host links in a storage area network, determining a maximum permitted data transfer rate based on the maximum possible data transfer rate;
   making a plurality of data transfers, through SAN fabric of the SAN and between a storage controller module of the SAN and various host links of the plurality of host links;
   for each data transfer, controlling, by a storage controller, the data transfer so that a data transfer rate for the data transfer does not exceed the maximum permitted data transfer rate; and
   maintaining a point to point congestion control mechanism, located in a data communication path between a switch and the storage controller in an unactivated status so that the storage controller employs a proactive strategy to avoid triggering congestion on the link between the storage controller and the switch.

2. The method of claim 1 further comprising:
   connecting a first host port to a plurality of storage systems so that the host port bandwidth is divided among the plurality of storage systems, such that the total data sent from all the storage systems to the host does not combine to saturate or overload host port links associated with the first host port.

3. The method of claim 1 wherein the storage controller module includes a set of storage controller(s) and SAN management software, the method further including:
   for each data transfer, querying, of the SAN management software and by the set of storage controller(s), to determine the maximum possible data transfer rate for a host link through which the corresponding data transfer will be sent.

4. The method of claim 1 wherein:
   the storage controller module includes a plurality of storage controllers; and
   the determination of maximum permissible data transfer rate for each host link is performed separately for each storage controller so that the sum of the maximum permissible data transfer rates for all the storage controllers with respect to a given host link does not exceed the maximum possible data transfer rate for that given host link.

5. The method of claim 1
   wherein the determination of a maximum possible data transfer rate for each host link includes at least one of the following:
   querying, by the storage controller, a SAN management service on the SAN to determine the bandwidth of the host link; or
   specifying, manually by a human administrator, the maximum possible data transfer rate when a host object associated with the respective host link is configured with the storage controller.

6. The method of claim 1 further comprising:
   connecting a first host port of a plurality of host ports to at least a first and second storage controller for redundancy; and
   co-ordinating the first and second storage controller so that the total data sent to the first host port is limited to the host port bandwidth.

7. A computer program product for storing and accessing data, the product comprising a computer readable storage medium having stored thereon:
   first program instructions executable by a device, to cause the device to, for each host link of a plurality of host links in a storage area network (SAN), determine a maximum possible data transfer rate;
   second program instructions executable by a device, to cause the device to, for each host link of a plurality of host links in the SAN, determine a maximum permitted data transfer rate based on the maximum possible data transfer rate;
   third program instructions executable by a device, to cause the device to make a plurality of data transfers, through a SAN fabric of the SAN and between a storage controller module of the SAN and various host links of the plurality of host links; and
   fourth program instructions executable by a device, to cause the device to, for each of the plurality of data transfers, control the data transfer so that a data transfer rate for the data transfer does not exceed the maximum permitted data transfer rate; and
   fifth program instructions programmed to maintain a point to point congestion control mechanism, located in a data communication path between a switch and the storage controller in an unactivated status so that the storage controller employs a proactive strategy to avoid triggering congestion on the link between the storage controller and the switch.

8. The product of claim 7 wherein the storage medium has further stored thereon:
sixth program instructions programmed to connect a first host port to a plurality of storage systems so that the host port bandwidth is divided among the plurality of storage systems, such that the total data sent from all the storage systems to the host does not combine to saturate or overload host port links associated with the first host port.

9. The product of claim 7 wherein:
the storage controller module includes a set of storage controller(s) and SAN management software; and
the computer program product has further stored thereon fifth program instructions executable by a device, to cause the device to, for each of the plurality of data transfers, a storage controller queries the SAN management software to determine the maximum possible data transfer rate for a host link through which the corresponding data transfer is to be sent.

10. The product of claim 7 wherein:
the storage controller module includes a plurality of storage controllers; and
the determination of maximum permissible data transfer rate for each host link, by the second program instructions, is performed separately for each storage controller so that the sum of the maximum permissible data transfer rates for all the storage controllers with respect to a given host link does not exceed the maximum possible data transfer rate for that given host link.

11. The product of claim 7 wherein the
first program instructions are programmed to do at least one of the following actions:
querying, by the storage controller, a SAN management service on the SAN to determine the bandwidth of the host link; or
responsive to user input, specifying, manually by a human administrator, the maximum possible data transfer rate when a host object associated with the respective host link is configured with the storage controller.

12. The product of claim 7 wherein the storage medium has further stored thereon:
sixth program instructions programmed to connect a first host port of a plurality of host ports to at least a first and second storage controller for redundancy; and
seventh program instructions programmed to co-ordinate the first and second storage controller so that the total data sent to the first host port is limited to the host port bandwidth.

13. A computer system comprising:
a processor(s) set; and
a computer readable storage medium;
wherein:
the processor set is structured, located, connected and/or programmed to run program instructions stored on the computer readable storage medium; and
the program instructions include:
first program instructions executable by a device, to cause the device to, for each host link of a plurality of host links in a storage area network (SAN), determine a maximum possible data transfer rate,
second program instructions executable by a device, to cause the device to, for each host link of a plurality of host links in the SAN, determine a maximum permitted data transfer rate based on the maximum possible data transfer rate,
third program instructions executable by a device, to cause the device to make a plurality of data transfers, through a SAN fabric of the SAN and between a storage controller module of the SAN and various host links of the plurality of host links, and
fourth program instructions executable by a device, to cause the device to, for each of the plurality of data transfers, control the data transfer so that a data transfer rate for the data transfer does not exceed the maximum permitted data transfer rate; and
fifth program instructions programmed to maintain a point to point congestion control mechanism, located in a data communication path between a switch and the storage controller in an unactivated status so that the storage controller employs a proactive strategy to avoid triggering congestion on the link between the storage controller and the switch.

14. The system of claim 13 wherein the storage medium has further stored thereon:
sixth program instructions programmed to connect a first host port to a plurality of storage systems so that the host port bandwidth is divided among the plurality of storage systems, such that the total data sent from all the storage systems to the host does not combine to saturate or overload host port links associated with the first host port.

15. The system of claim 13 wherein:
the storage controller module includes a set of storage controller(s) and SAN management software; and
the computer program product has further stored thereon fifth program instructions executable by a device, to cause the device to, for each data transfer, a query, of the SAN management software and by the set of storage controller(s), to determine the maximum possible data transfer rate for a host link through which the corresponding data transfer will be sent.

16. The system of claim 13 wherein:
the storage controller module includes a plurality of storage controllers; and
the determination of maximum permissible data transfer rate for each host link, by the second program instructions, is performed separately for each storage controller so that the sum of the maximum permissible data transfer rates for all the storage controllers with respect to a given host link does not exceed the maximum possible data transfer rate for that given host link.

17. The system of claim 13 wherein the
first program instructions are programmed to do at least one of the following actions:
querying, by the storage controller, a SAN management service on the SAN to determine the bandwidth of the host link; or
responsive to user input, specifying, manually by a human administrator, the maximum possible data transfer rate when a host object associated with the respective host link is configured with the storage controller.

18. The system of claim 13 wherein the storage medium has further stored thereon:
sixth program instructions programmed to connect a first host port of a plurality of host ports to at least a first and second storage controller for redundancy; and
seventh program instructions programmed to co-ordinate the first and second storage controller so that the total data sent to the first host port is limited to the host port bandwidth.

* * * * *